US006432548B1

(12) United States Patent
Alex et al.

(10) Patent No.: US 6,432,548 B1
(45) Date of Patent: Aug. 13, 2002

(54) COMPOSITIONS BASED ON POLYOLEFINS AND LOW-MELTING-POINT POLYAMIDES

(75) Inventors: Patrick Alex, Limours Pecqueuse; Jean-Jacques Flat, Serquigny; Philippe Blondel, Bernay; Gérard Reignier, Fontaine l'Abbe, all of (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/585,429

(22) Filed: Jun. 2, 2000

(30) Foreign Application Priority Data

Jun. 2, 1999 (FR) .............................. 99 06934

(51) Int. Cl.⁷ ..................... B32B 27/32; B32B 27/34
(52) U.S. Cl. ................ 428/475.8; 428/476.1; 428/516; 525/66; 525/179
(58) Field of Search ................ 525/66, 179; 428/475.8, 428/476.1, 516

(56) References Cited

U.S. PATENT DOCUMENTS

| | | | |
|---|---|---|---|
| 4,261,473 A | * | 4/1981 | Yamada et al. ............ 215/1 C |
| 4,338,413 A | * | 7/1982 | Coran et al. ................ 525/179 |
| 4,612,346 A | * | 9/1986 | Chiba et al. ................ 525/66 |
| 5,981,008 A | * | 11/1999 | Hofmann ................... 428/35.7 |
| 6,063,417 A | * | 5/2000 | Paleari et al. ............... 426/127 |
| 6,087,020 A | * | 7/2000 | Vandekerckhove et al. ...... 428/476.1 |

FOREIGN PATENT DOCUMENTS

| | | |
|---|---|---|
| EP | 0 459 862 | 12/1991 |
| EP | 0 807 519 | 11/1997 |
| FR | 2 311 814 | 12/1976 |
| FR | 2 743 746 | 7/1997 |
| WO | 88/02764 | 4/1988 |
| WO | 95/35347 | 12/1995 |

* cited by examiner

Primary Examiner—James J. Seidleck
Assistant Examiner—Melanie Bissett
(74) Attorney, Agent, or Firm—Millen, White, Zelano & Branigan, P.C.

(57) ABSTRACT

The invention relates to compositions containing a polyamide matrix (A) and a polyolefin dispersed phase (B), in which compositions the polyamide has a melting point below that of PA-6 and the dispersed phase consists of at least one polyolefin (B) chosen from functionalized polyolefins (B1) and non-functionalized polyolefins (B2). Advantageously, (A) is PA-6/12 or PA-6/6,6. These compositions are useful for making monolayer or multilayer films by extrusion with EVA or PE.

15 Claims, No Drawings

COMPOSITIONS BASED ON POLYOLEFINS AND LOW-MELTING-POINT POLYAMIDES

FIELD OF THE INVENTION

The present invention relates to compositions based on polyolefins and on low-melting-point polyamides and more particularly to compositions containing a polyamide matrix and comprising a polyolefin dispersed phase. They consist of, for example, PA-6/6,6, polyethylene or polypropylene and usually a compatiblizer which is, for example, a functionalized polyolefin. These compositions are useful for moulding articles or for making films used, for example, in packaging.

PROBLEM TO BE SOLVED

Compositions based on PA-6 and polyolefins, known elsewhere as being excellent barrier materials (with respect to $CH_3Br$, styrene, pentane, etc.), are processed, by. tubular blown-film extrusion for example, at temperatures of the order of 260° C. These temperatures are not compatible with coextruded structures in which at least one of the layers has a certain heat sensitivity such as a layer of ethylene-vinyl acetate (EVA) copolymers. In addition, these high temperatures cause processing problems for coextruded structures in the presence of PE (polyethylene) layers.

Moreover, films consisting of these compositions based on PA-6 and PE exhibit low tear strength in the longitudinal direction. Consequently, the invention proposes novel barrier films exhibiting improved tear strength, these being obtained within the context of a monolayer or multilayer construction containing at least one layer of an alloy of the low-melting-point polyamide/polyolefin type which can be processed, in tubular blown-film coextrusion, at low enough temperatures for them to be compatible with layers of heat-sensitive polymers.

PRIOR ART

The prior art has not disclosed this technical problem. Patent EP 766,913 discloses a film consisting of a blend comprising at least one polyamide and at least one polyolefin, the said film being laid out over an agricultural soil into which a fumigant is injected. Soil treatment by fumigation consists in injecting gases into the soil, before sowing or planting, in order to disinfect the earth, and then the soil is covered with a film of a plastic in order to retain these gases in the soil and thus allow them to act. It is possible, for example, to use methyl bromide, 1,3-dichloropropene, methyl chloride, 3,5-dimethyltetrahydro-1,3,5-thiadiazin-2-thione, sodium tetrathiocarbonate or metham sodium ($CH_3NHCS.S$ Na).

According to a first embodiment, this prior art also relates to a film comprising the above layer and a layer essentially consisting of a polyolefin. According to a second embodiment, this prior art also relates to a film comprising the previous layer arranged between two layers of polyolefin. The technical problem of the present invention was not mentioned; the polyamide used was still PA-6.

Patent EP 807,519 relates to a multilayer film, useful for making flexible sachets, comprising (i) a barrier film based on a polyamide/polyolefin blend and (ii) on at least one of its sides, a film based on a high-frequency weldable ethylene-unsaturated ester copolymer. It is useful for making flexible sachets of detergents, bleach or fabric softeners. The examples describe barrier films consisting of PA-6 and polyethylene and weldable EVA films. As in the previous prior art, the technical problem of the present invention was not mentioned and the polyamide used was still PA-6.

SUMMARY OF THE INVENTION

It has now been discovered that compositions based on polyolefins and low-melting-point polyamides can be produced which can be converted into films and can be coextruded with other polymers in order to make multilayer structures.

The invention therefore relates to compositions containing a polyamide matrix (A) and a polyolefin dispersed phase (B), in which compositions the polyamide has a melting point below that of PA-6 and the dispersed phase consists of at least one polyolefin (B) chosen from functionalized polyolefins (B1) and non-functionalized polyolefins (B2).

The present invention therefore relates to films consisting of the above compositions.

The films of the present invention have many advantages: they are processed at low temperature, they have a high tear strength and they exhibit a barrier nature.

Advantageously, the films of the invention may be processed at lower temperatures than alloys of the prior art based on PA-6 (melting point=223° C.), the tubular blown-film coextrusion of which is normally carried out at 260° C. A reduction of at least 20 to 30° C. is expected. This characteristic is most particularly beneficial in the field of multilayer film coextrusion in which the outer layers consist of PE (better bubble strength because of the higher viscosity of the PE layers) or of heat-sensitive copolymers of ethylene and polar monomers (for example, EVA). Thus, the thermal degradation of the external layers is limited.

Monolayer or multilayer films containing at least one layer according to the present invention exhibit improved tear strength in the longitudinal direction compared with constructions known to those skilled in the art, such as those described in EP 766,913. Compared with these PE-based films, the films according to the present invention possess lower permeabilities with respect to the following agents: $CH_3Br$, $O_2$ and $CO_2$.

DETAILED DESCRIPTION OF THE INVENTION

The expression "low-melting-point polyamide" should be understood to mean any polyamide whose melting point is less than 220° C. These are often copolyamides. Mention may be made of the copolyamides resulting from the condensation of at least two alpha,omega-aminocarboxylic acids or of two lactams, or of a lactam with an alpha,omega-aminocarboxylic acid. Mention may also be made of the copolyamides resulting from the condensation of at least one alpha,omega-aminocarboxylic acid (or a lactam) with at least one diamine and at least one dicarboxylic acid.

By way of examples of lactams, mention may be made of those having from 3 to 12 carbon atoms in the main ring, these being possibly substituted. Mention may be made, for example, of β,β-dimethylpropiolactam, α,α-dimethylpropiolactam, amylolactam, caprolactam, capryllactam and lauryllactam.

By way of examples of alpha,omega-aminocarboxylic acids, mention may be made of aminoundecanoic acid and aminododecanoic acid. By way of examples of dicarboxylic acids, mention may be made of adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid HOOC—(CH$_2$)$_{10}$—COOH.

The diamine may be an aliphatic diamine having from 6 to 12 carbon atoms—it may be an aryl diamine and/or a saturated cyclic diamine. By way of examples, mention may be made of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, diamine polyols, isophorone diamine (IPD), methylpentamethylenediamine (MPDM), bis(aminocyclohexyl)-methane (BACM) and bis(3-methyl-4-aminocyclohexyl)methane (BMACM).

The expression "low-melting-point polyamide" should also be understood to mean any amorphous polyamide having no melting point.

By way of examples of polyamides (A), mention may be made of caprolactam/lauryllactam copolymers (PA-6/12), caprolactam/hexamethylenediamine, adipic acid copolymers (PA-6/6,6), caprolactam/lauryllactam/hexamethylenediamine, adipic acid copolymers (PA-6/12/6,6), caprolactam/hexamethylenediamine, azelaic acid/11-aminoundecanoic acid/lauryllactam copolymers (PA-6/6,9/11/12), caprolactam/hexamethylenediamine, adipic acid/11-aminoundecanoic acid/lauryllactam copolymers (PA-6/6,6/11/12) and hexamethylenediamine, azelaic acid/lauryllactam copolymers (PA-6,9/12).

Advantageously, (A) is chosen from PA-6/12 and PA-6/6,6.

A non-functionalized polyolefin (B2) is conventionally a homopolymer or copolymer of alpha-olefins or of diolefins, such as, for example, ethylene, propylene, 1-butene, 1-octene and butadiene.

By way of examples, mention may be made of:
homopolymers such as polyethylene, particularly LDPE, HDPE, LLDPE or VLDPE, metallocene polyethylene, or polypropylene;
ethylene/alpha-olefin copolymers such as ethylene/propylene copolymers or EPRS;
styrene/ethylene-butylene/styrene block copolymers (SEBS), styrene/butadiene/styrene block copolymers (SBS), styrene/isoprene/styrene block copolymers (SIS), styrene/ethylene-propylene/styrene block copolymers (SEPS) and ethylene/propylene/diene monomer copolymers (EPDM);
copolymers of ethylene with at least one product chosen from salts or esters of unsaturated carboxylic acids such as alkyl (meth)acrylates (for example, methyl acrylate), or vinyl esters of saturated carboxylic acids such as vinyl acetate, the proportion of comonomer possibly being as much as 40% by weight.

The functionalized polyolefin (B1) may be an alpha-olefin polymer having reactive units (the functional groups); such reactive units are acid, anhydride or epoxy functional groups. By way of example, mention may be made of the above polyolefins (B2) which are grafted or are copolymerized or terpolymerized by unsaturated epoxides such as glycidyl (meth)acrylate, or by carboxylic acids or the corresponding salts or esters, such as (meth)acrylic acid (this possibly being completely or partially neutralized by metals such as Zn, etc.) or else by carboxylic acid anhydrides such as maleic anhydride. A functionalized polyolefin is, for example, a PE/EPR blend, the weight ratio of which may vary between wide limits, for example between 40/60 and 90/10, the said blend being cografted with an anhydride, especially maleic anhydride, with a degree of grafting, for example, of 0.01 to 5% by weight.

The functionalized polyolefin (B1) may be chosen from the following (co)polymers, grafted with maleic anhydride or glycidyl methacrylate, in which the degree of grafting is, for example, from 0.01 to 5% by weight:
PE, PP, copolymers of ethylene with propylene, butene, hexene, or octene and containing, for example, from 35 to 80% by weight of ethylene;
ethylene-vinyl acetate copolymers (EVA), containing up to 40% by weight of vinyl acetate;
ethylene-alkyl (meth)acrylate copolymers, containing up to 40% by weight of alkyl (meth)acrylate;
ethylene-vinyl acetate (EVA)-alkyl (meth)acrylate copolymers, containing up to 40% by weight of comonomers.

The functionalized polyolefin (B1) may also be chosen from ethylene/propylene copolymers containing predominantly propylene, these being grafted by, maleic anhydride and then condensed with a monoaminated polyamide (or polyamide oligomer) (products described in EP-A-0,342,066).

The functionalized polyolefin (B1) may also be a copolymer or terpolymer of at least the following units: (1) ethylene, (2) an alkyl (meth)acrylate or a vinyl ester of a saturated carboxylic acid and (3) an anhydride such as maleic anhydride or a (meth)acrylic acid or an epoxy such as glycidyl (meth)acrylate.

By way of examples of functionalized polyolefins of this latter type, mention may be made of the following copolymers, in which the ethylene preferably represents at least 60% by weight and in which the termonomer (the functional group) represents, for example, from 0.1 to 10% by weight of the copolymer:
ethylene/alkyl (meth)acrylate/(meth)acrylic acid or maleic anhydride or glycidyi methacrylate copolymers;
ethylene/vinyl acetate/maleic anhydride or glycidyl methacrylate copolymers;
ethylene/vinyl acetate or alkyl (meth)acrylate/(meth)acrylic acid or maleic anhydride or glycidyl methacrylate copolymers.

In the above copolymers, the (methyacrylic-acid may be salified with Zn or Li.

The term "alkyl (meth)acrylate" in (B1) or (B2) denotes C$_1$ to C$_8$ alkyl methacrylates and acrylates, and may be chosen from methyl acrylate, ethyl acrylate, n-butyl acrylate, isobutyl acrylate, 2-ethylhexyl acrylate, cyclohexyl acrylate, methyl methacrylate and ethyl methacrylate.

Moreover, the aforementioned polyolefins (B1) may also be crosslinked by any suitable process or agent (diepoxy, diacid, peroxide, etc.); the term functionalized polyolefin also includes blends of the aforementioned polyolefins with a difunctional reactive agent such as a diacid, dianhydride, diepoxy, etc., which is capable of reacting with them.

The copolymers mentioned above, (B1) and (B2), may be copolymerized so as to form random or block copolymers and may have a linear or branched structure.

The molecular weight, the MFI index and the density of the polyolefins may also vary over a wide range, as those skilled in the art will appreciate. MFI is the abbreviation for Melt Flow Index. It is measured according to the ASTM 1238 standard.

Advantageously, the non-functionalized polyolefins (B2) are chosen from any ethylene homopolymer or copolymer of ethylene and a higher comonomer, such as butene, hexene, octene or 4-methyl-1-pentene. Mention may be made, for example, of high-density PE, medium-density PE, linear low-density PE, low-density PE and very low-density PE. These polymers are known to those skilled in the art as being produced by a "radical" process, by "Ziegler"-type catalysis or, more recently, by so-called "metallocene" catalysis.

Advantageously, the functionalized polyolefins (B1) are chosen from any polymer comprising alpha-olefin units and units carrying polar reactive functional groups such as epoxy, carboxylic acid or carboxylic acid anhydride functional groups. By way of examples of such polymers, mention may be made of ethylene/alkyl acrylatelmaleic anhydride terpolymers or ethylene/alkyl acrylate/glycidyl methacrylate terpolymers, such as Lotader® polymers, or maleic-anhydride-grafted polyolefins such as the Orevac® polymers, as well as ethylene/alkyl acrylate/(meth)acrylic acid terpolymers.

The MFI of (A) and the MFIs of (B1) and (B2) may be chosen within a wide range; however, it is recommended, in order to facilitate the dispersion of (B) in the matrix (A), that the MFI of (A) be greater than that of (B).

Advantageously, the proportion of (A) is from 50 to 90 parts (by weight) per 50 to 10 parts of (B). For lower proportions of (B), for example 10 to 15 parts, it suffices to use a non-functionalized polyolefin (B2). The proportion of (B2) and (B1) in the dispersed phase (B) depends on the amount of functional groups present in (B1) as well as on their reactivity. Advantageously, 5 to 15 parts of (B1) per 30 to 20 parts of (B2), respectively, are used.

The compositions according to the invention may furthermore contain at least one additive chosen from:
- fillers (mineral fillers, fire retardants, etc.);
- fibres;
- dyes;
- pigments;
- brighteners;
- antioxidants;
- UV stabilizers.

The compositions of the invention are manufactured by melt blending of the constituents (A) and (B) using the standard techniques for thermoplastics. Mixers, extruders or kneaders may be used. The films are manufactured either by the blow extrusion of a tubular film or by extrusion casting.

The present invention also relates to multilayer structures comprising the above film and at least one film of a heat-sensitive polymer. The latter may be, for example, an EVA, an ethylene/alkyl (meth)acrylate copolymer or a polyethylene. These structures are manufactured by tubular blown-film coextrusion or coextrusion casting.

The films of the invention, which are monolayers or multilayers, are useful for items of packaging; for the packaging of polyesters to be crosslinked using the SMC technique as described in EP 786,319; for fumigation, as described in EP 766,913; for the packaging of detergents, bleaches or fabric softeners, as described in EP 807,519; and for the packaging of expanded polystyrene beads, as described in EP 907,508.

EXAMPLES

The following products were used:

Polyamides (A)

PA 1: Copolyamide 6/6,6 of medium viscosity, having a melting point of 196° C. and a melt flow index of 4.4 g/10 minutes according to ASTM 1238 at 235° C. under a weight of 1 kg.

PA 2; Copolyamide 6/6,6 of medium viscosity, having a melting point of 196° C. and a melt flow index of 6.6 g/10 minutes according to ASTM 1238 at 235° C. under a weight of 1 kg.

Polyamide of the prior art

PA 3: Polyamide 6 having a melting point of 223° C. and a melt flow index of 130 g/10 minutes according to ASTM 1238 at 275° C. under a weight of 5 kg.

Polyolefins (B2)

LLDPE: Linear low-density polyethylene having a density of 0.920 kg/l according to IS01872/1 and a melt flow index of 1 g/10 minutes according to ASTM 1238 at 190° C. under a weight of 2.16 kg.

HDPE: High-density polyethylene having a density of 0.952 kg/l according to ISO 1872/1 and a melt flow index of 0.4 g/10 minutes according to ASTM 1238 at 190° C. under a weight of 2.16 kg.

Polyolefins (BI)

Binder 1: This is a carrier PE having a maleic anhydride content of 3000 ppm and a melt flow index of 1 g/10 minutes according to ASTM 1238 at 190° C. under a weight of 2.16 kg.

Binder 2: This is an ethylene-acrylic ester (1)-maleic anhydride (2) terpolymer having a comonomer content (1+2) of 32% and a melt flow index of 7 g/10 minutes according to ASTM 1238 at 190° C. under a weight of 2.16 kg.

Antioxidants

Anti 1: Antioxidant of the hindered phenol type.

Anti 2: Secondary antioxidant of the phosphite type.

Preparation of the Compositions of the Invention and Comparative Examples

The low-melting-point copolyamide, the polyolefin and the functional polyolefin are introduced into the hopper of a 40 L/D, 40 mm diameter Werner & Pfleiderer corotating twin-screw extruder (having 9 barrel sections+4 spacers, i.e. a total length of 10 barrel sections) via three independent weigh feeders (or simply by dry preblending the various granules). The total throughput of the extruder is 50 kg/h, the rotation speed of the screws is 150 rpm and the material temperatures at the 3/4, 6/7 and 7/8 barrel sections and the die exit are 245, 263, 265 and 276° C., respectively. The extruded strands are granulated and then dried in a vacuum oven for 8 hours at 80° C.

Characterization of the Polymer Blends

The melt flow indices of the compositions were measured according to ASTM 1238 at 235° C. under a weight of 2.16 kg.

Processing of the Films

The polymer compositions were processed by extruding them as monolayer tubular blown film on a Kaufman PKH 20-65-type extruder having a PE/EVA-type screw with a Maddock-type mixer element, a 63.5 mm diameter and a 28 L/D ratio. Films 500 mm in width and 25 microns in thickness were produced.

The polymer compositions were processed by extruding them as three-layer tubular blown film on a KIEFEL-type extruder provided with a ring die 150 mm in diameter, a double-flow cooling ring, a gap set at 1.2 mm and with a blow ratio of 3.

Characterization of the Films

The films were characterized in terms of tensile strength in the extrusion direction and in the direction perpendicular to extrusion according to the ISO 527 standard for a pull speed of 500 mm/minute, and in terms of the tear strength in the extrusion direction and in the direction perpendicular to extrusion according to the NFT 64-141:84 standard and according to the Dart Test method (method A).

Compositions Produced

| Products | Ex. 1 | Ex. 2 | Ex. 3 | Ex. 4 | CEx. 1 |
|---|---|---|---|---|---|
| PA 1 | 64.3 | 64.3 | | | |
| PA 2 | | | 64.3 | 64.3 | |
| PA 3 | | | | | 64.3 |
| LLDPE | 27 | | 27 | | 25 |
| HDPE | | 27 | | 27 | |
| Binder 1 | 8 | 8 | 8 | 8 | |
| Binder 2 | | | | | 10 |
| Anti 1 | 0.5 | 0.5 | 0.5 | 0.5 | 0.5 |
| Anti 2 | 0.2 | 0.2 | 0.2 | 0.2 | 0.2 |

Examples E1 to E4 are in accordance with the invention; CE1 is a counterexample.

Melt Flow Indices of the Compositions Prepared

|  | E1 | E2 | E3 | E4 | CE1 |
|---|---|---|---|---|---|
| MFI | 1.7 | 0.7 | 2.6 | 0.7 | 2 |

Processing of the Compositions by Monolayer Tubular Blown-film Extrusion

The Ex.1 composition was processed by extruding it as monolayer tubular blown film comparatively with CEx1. Comparison of the extrusion conditions shows that there is a reduction of approximately 20° C. in the material temperatures in favour of Ex.1, as shown in the table below:

| | Barrel temperature | | | | Die temperature | | | | |
|---|---|---|---|---|---|---|---|---|---|
| Zone | Z1 | Z2 | Z3 | Z4 | Adapter | F1 | F2 | F3 | Material |
| Ex. 1 | 200 | 215 | 215 | 220 | 220 | 220 | 220 | 220 | 240 |
| CEx. 1 | 230 | 235 | 240 | 250 | 240 | 240 | 240 | 240 | 262 |

Tear

The tear strengths in the longitudinal direction according to the NFT 64-141:84 standard were measured on monolayer films after conditioning them for 8 hours at 23° C. and 50% RH. The recorded values given in the table below demonstrate that there is an improvement in the tear strength in the case of films according to the invention compared with the counter-example.

| Reference | E1 | E2 | CE1 |
|---|---|---|---|
| Tear strength (cN) | 71 | 74 | 12 |

The tear strengths in the longitudinal direction according to the NFT 64-141:84 standard were measured on three-layer films after conditioning them for 8 days at 23° C. and 50% RH. The compositions of the three-layer films are specified below:

F1: Exceed ECD103+10% Orevac R//Ex 1//Lacqtène 1003FE23+10% Orevac R (11/10/11 μm)
F2: Exceed ECD103+10% Orevac R//Ex 2//Lacqtène 1003FE23+10% Orevac R (11/10/11 μm)
F3: Exceed ECD103+10% Orevac R//Ex 3//Lacqtène 1003FE23+10% Orevac R (11/0/10/11 μm)
F4: Exceed ECD103+10% Orevac R//Ex 4//Lacqtène 1003FE23+10% Orevac R (11/10/11 μm)
CF5: Exceed ECD103+10% Orevac R//CEx 1//Lacqtène 1003FE23+10% Orevac R (11/10/11 μm).

F1 to F4 are in accordance with the invention and CF5 is a comparative example. In these films, the following products were used:

Exceed ECD103 is an ethylene copolymer obtained by metallocene catalysis, having a relative density of 0.917 according to ISO 1872/1 and an MFI of 1 according to ASTM D 1238.

Orevac® R is a maleic-anhydride-grafted polyethylene (it contains 0.3% by weight of maleic anhydride) with a relative density of 0.920 and an MFI of 1 at 190° C./2.16 kg. 10% by weight of this product was added to the Exceed ECD103 and to the Lacqtène 1003FE23.

Lacqtène 1003FE23 is a radical low-density polyethylene (LDPE) having a relative density of 0.923 according to ISO 1872/1 and 0.3 MFI at 190° C./2.16 kg according to ASTM D 1238. "11/10/11" denotes the thicknesses of the layers in μm.

| Reference | F1 | F2 | F3 | F4 | CF5 |
|---|---|---|---|---|---|
| Tear strength (cN) | 67 | 62 | 66 | 56 | 18 |

Permeability

The permeabilities of the monolayer films were measured according to the NFT 54-195 standard. The values obtained for the films according to the invention allow them to be classified as barrier products. The tables below allow polyolefins to be compared.

| Oxygen permeability at 23° C./0% RH. | | | |
|---|---|---|---|
| | Ex. 1 | Ex. 2 | HDPE |
| $O_2$GTR in cc. 25 μm/m² · 24 h | 128 | 124 | 2000 |

"HR" means relative humidity and
"$O_2$GTR" denotes the oxygen permeability of the films measured according to ASTM D 3985 and expressed in cm³ of oxygen per m² per 24 hours for a pressure difference of 1 bar and a thickness of 25 pm. $O_2$GTR varies proportionally with the inverse of the film thickness.

| Methyl bromide permeability at 20° C. | | | |
|---|---|---|---|
| | Ex. 1 | Ex. 4 | LDPE |
| $CH_3Br$ permeability in g. 50 μm/m² · h | 0.099 | 0.037 | 50 |

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/069.34, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A multilayer structure comprising:
   (I) at least one film of a heat sensitive polymer selected from the group consisting of EVAs, ethylene/alkyl (meth)acrylate copolymers and polyethylenes; and
   (II) at least one film produced from a composition comprising a polyamide matrix (a) having a melting point below PA-6 wherein said matrix (a) results from the condensation of at least one alpha, omega-amino carboxylic acid (or a lactam) with at least one diamine and at least one dicarboxylic acid; and said polyamide matrix contains a polyolefin dispersed phase (B) a copolymer of ethylene and a higher alpha-olefin comonomer selected from the group consisting of butene, hexene, octene and 4-methyl-1-pentene.

2. A multilayer structure according to claim 1, wherein the heat sensitive film comprises an ethylene-vinyl acetate polymer.

3. A multilayer structure according to claim 1, wherein the dispersed phase further comprises a functionalized polyolefin the latter being any polymer comprising alpha-olefin units and units carrying polar reactive functional groups.

4. A multilayer structure according to claim 1, in which the proportion of (a) is from 50 to 90 parts by weight per 50 to 10 parts of (B).

5. A multilayer structure comprising:
   (I) at least one film of a heat sensitive polymer selected from the group consisting of EVAs, ethylene/alkyl (meth)acrylate copolymers and polyethylenes; and
   (II) at least one film produced from a composition comprising a polyamide matrix (a) having a melting point below PA-6 wherein said matrix comprises PA-6/6,6, and said polyamide matrix (a) contains a polyolefin dispersed phase comprising an ethylene homopolymer or a copolymer of ethylene and a higher alpha-olefin comonomer.

6. A multilayer structure according to claim 5, wherein the heat sensitive film comprises an ethylene-vinyl acetate polymer.

7. A multilayer structure according to claim 5, wherein the dispersed phase is a homopolymer of ethylene.

8. A multilayer structure according to claim 7, wherein the heat sensitive film comprises an ethylene-vinyl acetate polymer.

9. A multilayer structure according to claim 5, wherein the dispersed phase further comprises a functionalized polyolefin the latter being any polymer comprising alpha-olefin units and units carrying polar reactive functional groups.

10. A multilayer structure comprising:
    (I) at least one film of a heat sensitive polymer selected from the group consisting of EVAs, ethylene/alkyl (meth)acrylate copolymers and polyethylenes; and
    (II) at least one film produced from a composition comprising a polyamide matrix (a) having a melting point below PA-6 wherein said matrix (a) results from the condensation of at least one alpha, omega-amino carboxylic acid (or a lactam) with at least one diamine and at least one dicarboxylic acid; and said polyamide matrix contains a polyolefin dispersed phase (B) comprising a functionalized polyolefin comprising alpha-olefin units in carrying polar reactive functional groups selected from the group consisting of epoxy carboxylic acid and carboxylic acid anhydride groups.

11. A multilayer structure comprising:
    (I) at least one film of a heat sensitive polymer selected from the group consisting of EVAs, ethylene/alkyl (meth)acrylate copolymers and polyethylenes; and
    (II) at least one film produced from a composition comprising a polyamide matrix (a) having a melting point below PA-6 wherein said matrix (a) results from the condensation of at least one alpha, omega-amino carboxylic acid (or a lactam) with at least one diamine and at least one dicarboxylic acid; and said polyamide matrix contains a polyolefin dispersed phase (B) selected from the group consisting of ethylene/alkyl acrylate/maleic anhydride terpolymers, ethylene/alkyl acrylate/glycidyl methacrylate terpolymers, maleic-anhydride-grafted polyolefins and ethylene/alkyl acrylate (meth)acrylic acid terpolymers.

12. A multilayer structure comprising:
    (I) at least one film of a heat sensitive polymer selected from the group consisting of EVAs, ethylene/alkyl (meth)acrylate copolymers and polyethylenes; and
    (II) at least one film produced from a composition comprising a polyamide matrix (a) having a melting point below PA-6 wherein said matrix (a) results from the condensation of at least one alpha, omega-amino carboxylic acid (or a lactam) with at least one diamine and at least one dicarboxylic acid; and said polyamide matrix contains a polyolefin dispersed phase (B) chosen from functionalized polyolefins (B1) and non-functionalized polyolefins (B2), said non-functionalized polyolefins (B2) being either an ethylene homopolymer or a copolymer of ethylene and a higher alpha-olefin copolymer wherein (B) comprises 5–15 parts of (B1) per 30–25 parts of (B2).

13. A multilayer structure comprising:
    (I) at least one film of a heat sensitive polymer selected from the group consisting of EVAs, ethylene/alkyl (meth)acrylate copolymers and polyethylenes; and
    (II) at least one film produced from a composition comprising a polyamide matrix (a) having a melting point below PA-6 wherein said matrix (a) results from the condensation of at least one alpha, omega-amino carboxylic acid (or a lactam) with at least one diamine and at least one dicarboxylic acid; and said polyamide matrix contains a polyolefin dispersed phase (B), wherein the dispersed phase comprises an ethylene homopolymer or a copolymer of ethylene and a higher alpha-olefin comonomer.

14. A multilayer structure according to claim 13, wherein the dispersed phase is a homopolymer of ethylene.

15. A multilayer structure according to claim 13, wherein the dispersed phase further comprises a functionalized polyolefin the latter being any polymer comprising alpha-olefin units and units carrying polar reactive functional groups.

* * * * *